(12) United States Patent
Ferderer et al.

(10) Patent No.: US 8,365,521 B2
(45) Date of Patent: Feb. 5, 2013

(54) EXHAUST GAS DIFFUSER

(75) Inventors: Jake Tyler Ferderer, Kirkland, WA (US); Michael A. Waggoner, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 384 days.

(21) Appl. No.: 12/533,936

(22) Filed: Jul. 31, 2009

(65) Prior Publication Data

US 2011/0023473 A1    Feb. 3, 2011

(51) Int. Cl.
*F01N 1/00* (2006.01)

(52) U.S. Cl. ............................ 60/324; 60/316; 60/317

(58) Field of Classification Search .............. 60/299, 60/309, 324, 316, 317
See application file for complete search history.

(56) References Cited

U.S. PATENT DOCUMENTS

| | | | |
|---|---|---|---|
| 3,030,005 A * | 4/1962 | Le Nabour et al. ........... 417/179 |
| 3,174,709 A | 3/1965 | Alderson |
| 3,525,418 A | 8/1970 | Smith |
| 3,981,448 A * | 9/1976 | Demogenes et al. ...... 239/127.3 |
| 4,566,270 A | 1/1986 | Ballard |
| 4,864,819 A * | 9/1989 | Steyer ............................. 60/264 |
| 4,903,484 A | 2/1990 | Yates |
| 4,970,859 A | 11/1990 | Yates |
| D357,665 S | 4/1995 | Creyts |
| 5,916,136 A * | 6/1999 | Ettere ............................ 60/316 |
| 2008/0116005 A1 | 5/2008 | Matte |

FOREIGN PATENT DOCUMENTS

WO    2008/030258 A2    3/2008

* cited by examiner

*Primary Examiner* — Thomas Denion
*Assistant Examiner* — Diem Tran
(74) *Attorney, Agent, or Firm* — Christensen O'Connor Johnson Kindness PLLC

(57) ABSTRACT

A flow diffuser for vehicles of the type having an engine and an exhaust pipe generally includes a body having a first end configured for attachment to an exhaust pipe, and a diffusion portion including first and second diffusion sections, and a plurality of diversion wings disposed within the body.

10 Claims, 6 Drawing Sheets

EXHAUST GAS DIFFUSER

BACKGROUND

New, more stringent emission limits for diesel engines necessitate the use of exhaust after-treatment devices, such as diesel particulate filters. Certain after-treatment devices include a regeneration cycle. During the regeneration cycle, the temperature of the exhaust gas plume may rise significantly above acceptable temperatures normally experienced by exhaust systems without such after-treatment devices. As an example, exhaust systems without after-treatment devices typically discharge exhaust gas at a temperature of around 650 degrees Kelvin. An exhaust system having an after-treatment device that includes a regeneration cycle may experience an exhaust gas plume temperature exceeding 900 degrees Kelvin at its center core. Exhaust gas at this high exit temperature creates a potentially hazardous operating environment.

Prior art and current exhaust pipe diffusers passively feed cooling ambient air directly through the duct wall, but do not optimally intermingle the cooling air with the hot core stream in the center of the exhaust pipe. The result at the exit plane is a cool ring of exhaust flow surrounding a very hot exhaust core.

Thus, there exists a need for a flow diffuser for an exhaust pipe for diffusing hot exhaust gas on exit from an exhaust pipe.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a flow diffuser for vehicles of the type having an engine and an exhaust pipe is provided. The flow diffuser generally includes a body having a first end configured for attachment to an exhaust pipe, and a diffusion portion including first and second diffusion sections. The flow diffuser further includes a plurality of diversion wings disposed within the body.

In accordance with another embodiment of the present disclosure, in a land vehicle of the type having an engine and an exhaust system including an exhaust pipe, a flow diffuser for the exhaust pipe is provided. The flow diffuser generally includes a body having a first end configured for attachment to an exhaust pipe, and a diffusion portion including first and second diffusion sections. The flow diffuser further includes a plurality of diversion wings disposed within the body, the diversion wings configured to increase exhaust gas turbulence and to direct exhaust downwardly through the first diffusion section and outwardly through the second diffusion section.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
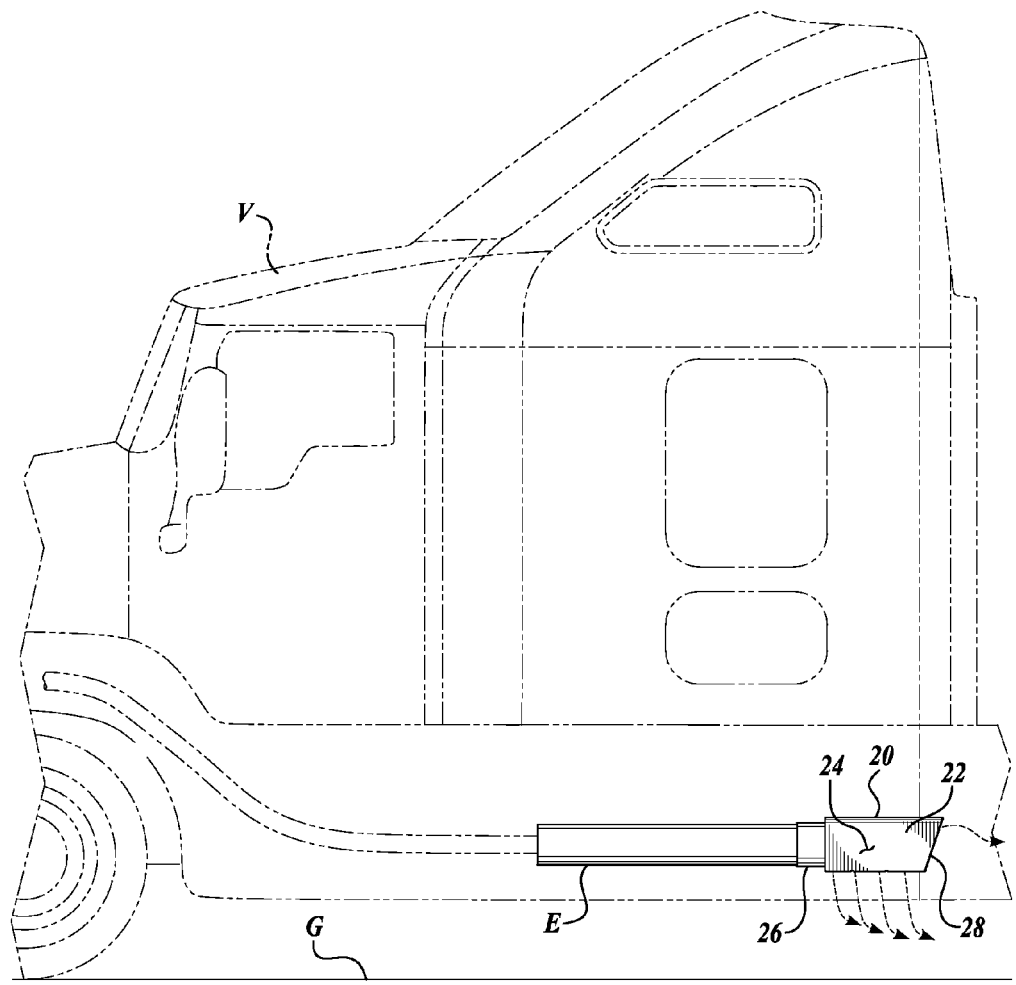
FIG. 1 is a side view of a flow diffuser formed in accordance with one embodiment of the present disclosure, showing the flow diffuser coupled to a vehicle of the type having an engine and an exhaust pipe.
Figure 2:
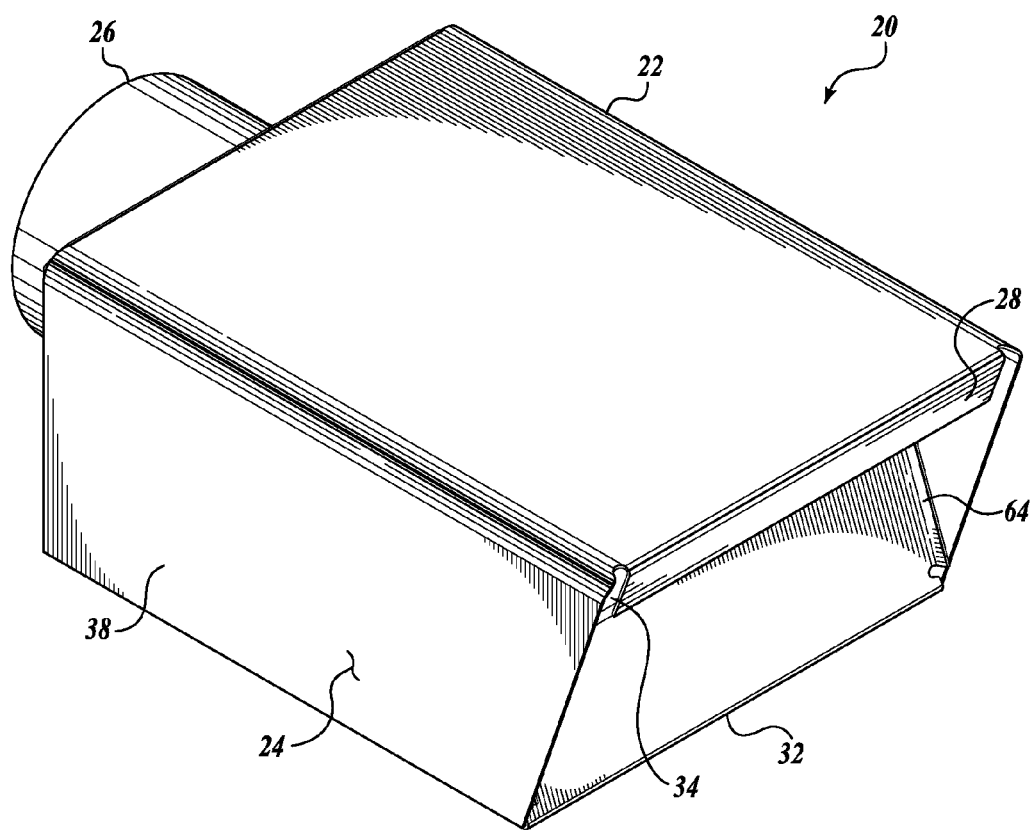
FIG. 2 is a top perspective view of the flow diffuser of FIG. 1.

Embodiments of the present disclosure are generally directed to flow diffusers for exhaust systems including exhaust pipes. A flow diffuser 20 constructed in accordance with one embodiment of the present disclosure may be best understood by referring to FIGS. 1-4. The flow diffuser 20 includes a main body 22 having an outer surface 24 and first and second ends 26 and 28. The first end 26 is configured for attachment to an exhaust pipe E, for example, a 5-inch diameter nominal pipe having a circular cross section. The flow diffuser 20 further includes a diffusion portion 30 having an optimized flow configuration for heat dissipation as exhaust gas moves from the first end 26 to the second end 28. During the operation of a vehicle, for example, the vehicle V shown in the illustrated embodiment of FIG. 1, exhaust gas travels through an exhaust pipe E and is diffused to the surrounding ambient air by the flow diffuser 20.

Flow diffusers 20 of the present disclosure reduce temperature and velocity profiles of hot exhaust gas plumes after exiting an exhaust pipe E to reduce the risk of danger associated with hot exhaust pipe discharge. As discussed in greater detail below, specifically, with reference to the EXAMPLE below, the flow diffusers described herein promote ready mixing and diffusion of hot exhaust gas with cooler surrounding ambient air for heat dissipation. Moreover, the embodiments described herein are also configured such that the combined flow area of the diffusion portion 30 is equal to or greater than the flow area of the inlet or first end 26 to maintain or reduce exhaust gas velocity at the diffusion portion 30 and prevent back pressure within the flow diffuser 20.

Although illustrated and described in conjunction with under-chassis exhaust pipes, other configurations, such as vertical (i.e., stack) exhaust pipes, are also intended to be within the scope of the present disclosure. In a stack exhaust pipe application, exhaust gas diffusion is important to prevent combustion of ignitable objects nears the stack, such as a bridge, tree, etc. It should be appreciated that the first end 26 is an inlet, connectable to the exhaust pipe E (see FIG. 1) by any means known to those having ordinary skill in the art, including by an interference fit, welding, or any suitable fastening devices, such as bolts, rivets, or other fasteners.

The main body 22 of the diffuser is configured in a box-like design to simplify manufacturing processes, having a lower surface 32, an upper surface 34, and side surfaces 36 and 38. However, it should be appreciated that other three-dimensional shapes are also within the scope of the present disclosure. The materials for the main body 22, as well as for other portions of the flow diffuser 20, may include metals and other materials that are capable of withstanding high temperatures.

As mentioned above, the flow diffuser 20 includes a diffusion portion 30. The diffusion portion 30 defines an exit area for exhaust gases to exit the flow diffuser 20. Referring to the illustrated embodiment of FIGS. 1-4, the diffusion portion 30 of the flow diffuser 20 includes a first diffusion section 40 and a second diffusion section 42, shown as downward and rearward diffusion sections, respectively, in the orientation of the flow diffuser 20 shown in FIGS. 1-4. It should be appreciated that the terms "downward", "rearward", "lower", "upper", and "side" are used in the specification with reference to the orientation of the flow diffuser 20 on a vehicle V, as shown in FIGS. 1-4, and are not intended to be limiting.

Figure 3:
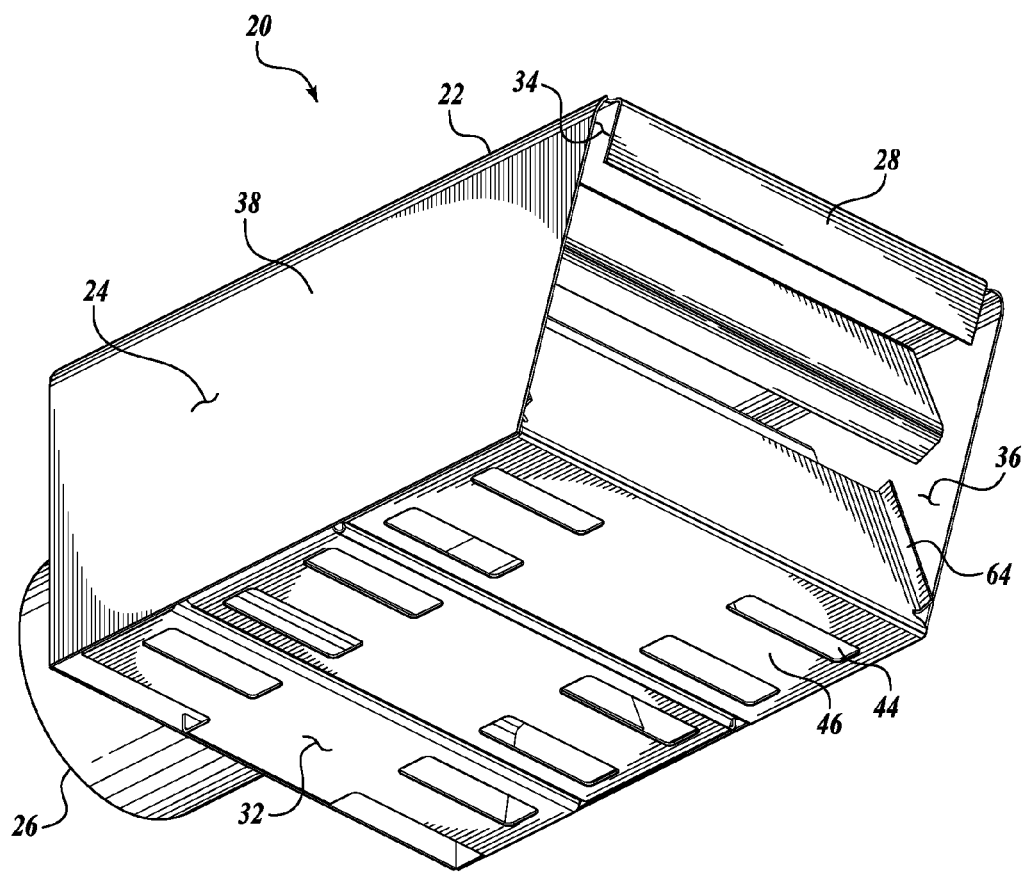
FIG. 3 is a bottom perspective view of the flow diffuser of FIG. 1.
Figure 4:
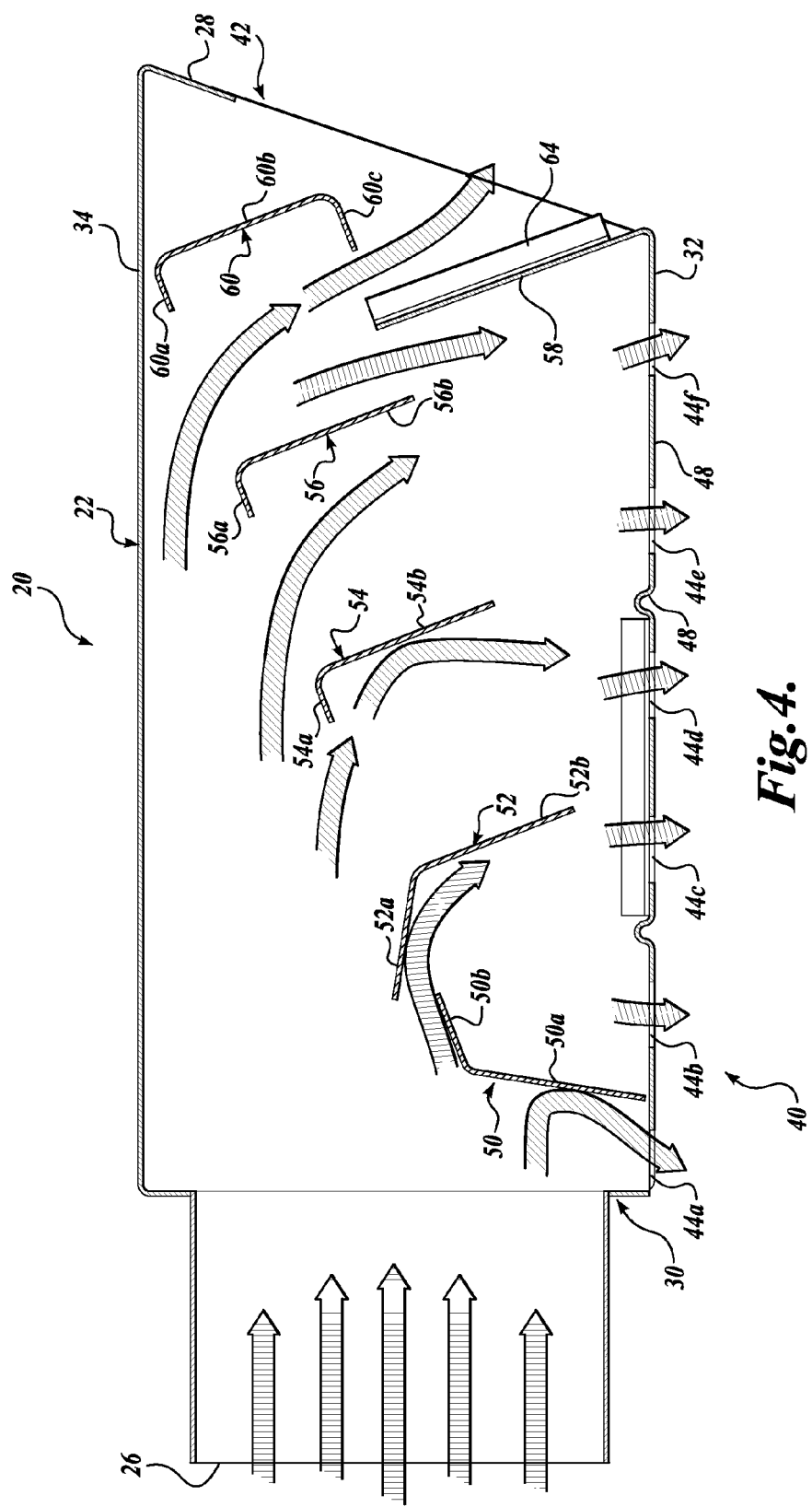
FIG. 4 is a cross-sectional side view of the flow diffuser of FIG. 1 through the plane 4-4 in FIG. 3.

Referring to FIG. 3, the first diffusion section 40 includes a plurality of diffusion ports 44 (see also 44a-44f in FIG. 4). In the illustrated embodiment, the diffusion ports 44 are shown as elongated slots on the lower surface 32 of the main body 22, the elongated slots 44 each having an average length and an average width. In the orientation shown in the illustrated embodiment of FIG. 1, the first diffusion section 40 expels exhaust gas to the ground G or other surface on which the vehicle V drives. In this manner, the exhaust gas is directed downwardly, away from the vehicle chassis to reduce the risk of damage to the vehicle V or injury to any people on or near the vehicle V when in operation. It should be appreciated, however, that in other configurations, the first diffusion section 40 may expel exhaust gas in other directions besides or in addition to the downward direction.

The elongated slots have an optimized relationship between slot perimeter and slot area to promote rapid fluid mixing of the hot exhaust gas with the surrounding ambient air. As described in greater detail below with respect to the mixing principles of the flow diffuser 20, an optimized perimeter to flow area relationship provides for a smaller center core of hot exhaust gas in each of the hot exhaust gas streams discharged from the slots 44. Therefore, the elongated slots promote enhanced fluid mixing and temperature distribution for more rapid heat dissipation of the hot exhaust gas streams.

In the illustrated embodiment of FIG. 3, the perimeter to flow area relationship or shape factor (a measure of compactness of a shape, expressed mathematically as $4\pi*\text{area}/(\text{perimeter})^2$) of the slots 44 is less than about 0.7. For the most compact shape, the circle, the shape factor is equal to 1.0. As a shape elongates, the shape factor decreases, such that a square cross section has a shape factor of 0.785. An infinitely long and narrow shape has a shape factor of 0. In another embodiment of the present disclosure, the shape factor of the slots 44 is less than about 0.5. In another embodiment of the present disclosure, the shape factor of the slots 44 is less than about 0.3. In yet another embodiment of the present disclosure, the shape factor of the slots 44 is in the range of about 0.1 to about 0.7. In yet another embodiment of the present disclosure, the shape factor of the slots 44 is in the range of about 0.1 to about 0.5. In yet another embodiment of the present disclosure, the shape factor of the slots 44 is in the range of about 0.1 to about 0.3.

The slots 44 are suitably spaced from one another to define a spacing 48 between adjacent slots 44. In contrast with systems not having adequate spacing between adjacent slots, for example, baffled slot systems, the configurations of the present disclosure provide increased mixing and cooling with cooler ambient air residing in the spacing 48 between the slots 44. As a result of this spacing 48, cooler ambient air is entrained into the exhaust gas streams as they exit from the flow diffuser 20, as described in greater detail below with respect to the mixing principles of the flow diffuser 20. In addition, adequate spacing is required between slots 44, so as to maintain the durability of the lower surface 32 of the main body 22 between the slots 44. In that regard, if slots are too closely spaced to one another, the slots are separated by only a thin portion of the outer surface, for example, a thin piece of metal, which creates a durability problem, because the hot exhaust gas may burn through such a thin piece of metal over time.

In the illustrated embodiment, the spacing 48 adjacent each of the slots 44 is at least as great as the average width of the adjacent slots. In other embodiments, the spacing between slots may be at least twice as great as the average width of the adjacent slots. In other embodiments, the spacing between slots may be at least three times the average width of the adjacent slots. In yet other embodiments, the spacing between slots is one to five times the average width of the slots.

Although the flow diffuser 20 is illustrated as having twelve equidistantly spaced slots 44, it should be apparent that the number of slots is not intended to be limiting so long as the combined flow area of the slots 44 is equal to or greater than the flow area at the first end 26, where the flow diffuser 20 is attached to an exhaust pipe E. As such, a flow diffuser 20 having more or fewer than twelve slots 44 is within the scope of the present disclosure. It should be appreciated, however, that the number of slots may be limited by design restrictions and/or the number of slots that can be accommodated along the length of the flow diffuser 20. It should further be appreciated that other diffusion portion configurations are also within the scope of the present disclosure. For example, in one embodiment, the slots 44 may be alternatingly offset by about half the average length of the adjacent slots.

It should be appreciated that the slots 44 may be aligned or offset in any suitable configuration. It should further be appreciated that the slots 44 may be configured to extend transversely, longitudinally, or angled relative to a center longitudinal axis extending through the main body 22. In addition, the slots 44 may be configured in straight, curved, and arcuate designs, including, as a nonlimiting example, a substantially serpentine configuration. It should further be appreciated that nonparallel, nonuniform, and nonequidistantly spaced slots 44 are also within the scope of the present disclosure.

In addition, it should be appreciated that the diffusion ports 44 may include louvers between adjacent ports 44 to define louvered slots. Such louvers may assist in further breaking up the exhaust stream to promote enhanced exhaust gas mixing.

Referring to FIGS. 3 and 4, the second diffusion section 42 will now be described. In the illustrated embodiment, the second diffusion section 42 includes a rearward port at the second end 28 of the flow diffuser 20. The second diffusion section 42 therefore allows for some of the exhaust gas to travel from the first end 26 to the second end 28 of the flow diffuser 20 before exiting from the second end 28 to help decrease back pressure during the vehicle exhaust stroke. Although shown in the illustrated embodiment as a large exit area, it should be appreciated that a significant amount of exhaust gas entering the flow diffuser 20 at the first end 26 is diverted to the first diffusion section 40 by a plurality of diversion wings, described in greater detail in the paragraphs that follow.

As best seen in the side cross-sectional view of the flow diffuser 20 in FIG. 3, the diffuser 20 further includes a plurality of diversion wings 50, 52, 54, 56, 58, and 60 internal to the main body 22 for redirecting exhaust and encouraging exhaust stream mixing at the exit ports. In the illustrated embodiment, the diffuser 20 includes six diversion wings. However, it should be appreciated that any number of diversion wings are within the scope of the present disclosure. It should be appreciated that the diversion wings may be positioned in the main body 22 of the flow diffuser 20 by being attached to the side walls of the main body 22. For example, referring to FIGS. 2-3, it can be seen that diversion wing 58 is attached to side wall 38 by tab 64, which may be welded, adhered, or otherwise attached to the side wall 38. Other suitable positioning and attachment are also within the scope of the present disclosure.

In use, exhaust gas flows into the inlet 24 and the main body 22 of the flow diffuser 20. As the exhaust gas encounters the diversion wings, some of the flow is directed immediately downwardly toward the first diffusion section 40, while some of the flow continues in the travel path that it started in at the inlet 24 to the second diffusion section 42. In the illustrated embodiment of FIG. 4, the diversion wings are configured in a pattern to direct substantially equal amounts of exhaust gas to each of the plurality of ports 44 in the first diffusion section 40. In that regard, traveling from the first end 26 to the second end 28, each of the diversion wings 50, 52, 54, 56, 58, and 60 is located closer to the upper surface 34 of the main body 22 of the flow diffuser 20.

The first diversion wing 50 is substantially V-shaped, having first and second substantially planar surfaces 50*a* and 50*b*. The first surface 50*a* is positioned to generally guide exhaust gas to the first port 44*a*, and the second surface 50*b* is positioned to generally guide exhaust gas upwardly and away from the first port 44*a*.

The advantage of such substantially planar surfaces is that the diversion wings 50, 52, 54, 56, 58 are easy to manufacture and only require one or more bends between substantially planar surfaces. However, it should be appreciated that non-planar or arcuate diversion wings (see, for example, FIG. 5) are also within the scope of the present disclosure. In addition, in their substantially planar configurations the diversion wings are generally fabricated in V-, L-, or U-shaped designs. However, it should be appreciated that other configurations and designs are also within the scope of the present disclosure.

The second diversion wing 52 is also substantially V-shaped, having first and second substantially planar surfaces 52*a* and 52*b*. The first and second surfaces 52*a* and 52*b* are positioned to generally guide exhaust gas to the second and third ports 44*b* and 44*c*. Between the first and second diversion wings 50 and 52, a small gap is configured to permit a portion of exhaust gas to travel to the second and third ports 44*b* and 44*c*. However, the remainder of the exhaust gas that does not enter gap continues to travel toward the third, fourth, fifth, and sixth diversion wings 54, 56, 58, and 60.

The third diversion wing 54 is substantially L-shaped, having first and second substantially planar surfaces 54*a* and 54*b*. The first and second surfaces 54*a* and 54*b* are positioned to generally guide exhaust gas to the fourth port 44*d*. Between the second and third diversion wings 52 and 54, a gap is configured to permit a portion of exhaust gas to travel to the fourth port 44*d*. However, the remainder of the exhaust gas that does not enter gap continues to travel toward the fourth, fifth, and sixth diversion wings 56, 58, and 60.

The fourth diversion wing 56 is also substantially L-shaped, having first and second substantially planar surfaces 56*a* and 56*b*. The first and second surfaces 56*a* and 56*b* are positioned to generally guide exhaust gas to the fifth port 44*e*. Between the third and fourth diversion wings 54 and 56, a gap is configured to permit a portion of exhaust gas to travel to the fifth port 44*e*. However, the remainder of the exhaust gas that does not enter gap continues to travel toward the fifth and sixth diversion wings 58 and 60.

The fifth diversion wing 58 is substantially planar and extends from the edge of the lower surface 32 creating an acute angle with the lower surface 32. The fifth diversion wing 58 is positioned to prevent exhaust gas from exiting directly through the second diffusion section 42 at a high velocity. Rather, the fifth diversion wing 58 is positioned to generally guide exhaust gas back to the first diffusion section 40 and ports 44*f*, 44*e*, 44*d*, 44*c*, 44*b*, and 44*a*.

The sixth diversion wing 60 is substantially U-shaped, having first, second, and third substantially planar surfaces 60*a*, 60*b*, and 60*c*. The first and second surfaces 60*a* and 60*b* are positioned to generally guide exhaust gas through gap located between the fourth and fifth diversion wings 56 and 58 to the sixth port 44*f* or through gap located between the fifth and sixth diversion wings 58 and 60 out the second diffusion section 42. In addition, the sixth diversion wing 60 is positioned to permit a portion of exhaust gas to travel between the first surface 60*a* and the upper surface 34 of the main body 22 and out the second diffusion section 42. Moreover, the sixth diversion wing 60 may be optimally positioned and configured to encourage mixing by Coandă Effect.

The heat transfer and fluid mixing promoted by the flow diffuser 20 of the illustrated embodiment of FIGS. 1-4 will now be described in greater detail. The effects of the heat transfer and fluid mixing promoted by the flow diffuser 20 can be seen in the comparative graph of FIG. 6, described in greater detail below in the EXAMPLE. When in use, heat dissipation of hot exhaust gas is achieved through the flow diffuser 20 in at least four ways: (1) by heat conduction; (2) by velocity reduction; (3) by introducing ambient air into the exhaust stream at the exit plane; and (4) by breaking up the exhaust stream to encourage turbulence and mixing with ambient air at the exit plane. As will be described in greater detail below, velocity reduction and mixing with ambient air, in turn, result in reduction of the center core of the hot exhaust gas streams exiting the flow diffuser 20 to promote enhanced fluid mixing upon exit. Enhanced fluid mixing results in more rapid heat dissipation of the exhaust gas with the surrounding ambient air. It should be appreciated that fluid mixing contributes more significantly to the overall heat dissipation of the flow diffuser 20 than heat dissipation by conduction (for example, heat loss through the outer surface 24 of the flow diffuser 20).

First, heat is dissipated from the effective surface area of the flow diffuser 20 to the surrounding ambient air. The wall thickness of the outer surface 24 of the main body 22, as well as the thermal resistivity of the material from which the flow diffuser 20 is constructed, contribute to the conductive cooling achieved by the flow diffuser 20, in accordance with the principles of heat transfer. It should further be appreciated that additional cooling of the flow diffuser 20 surface may be achieved by convective cooling. For example, if the vehicle V to which the flow diffuser 20 is attached is moving, the fluid flow of the surrounding ambient air over the flow diffuser 20 will provide additional convective cooling.

Second, because the flow area of the diffusion ports 40 and 42 may be greater than the flow area at the inlet or first end 26 of the flow diffuser 20, the velocity of the exhaust gas may decrease as it exits the diffusion portion 30. Decreased exhaust gas velocity allows for a decreased penetration distance of the jet exhaust streams, which further allows for enhanced mixing of the exhaust gas streams with the surrounding ambient air. In addition to the mixing advantages described herein, increased flow area at the diffusion portion 30 also helps decrease back pressure during the vehicle exhaust stroke.

Third and fourth, heat dissipation is promoted through breaking up the exhaust stream to encourage turbulence and mixing, as well as by introducing ambient air into the exhaust stream. With regard to the mixing effects, it should be appreciated that exhaust gas generally has a non-laminar flow at a high velocity and, comparatively, the surrounding ambient air generally has a substantially quieter flow at a lower velocity. As the exhaust gas exits the flow diffuser 20, the diffusion sections 40 and 42 create a plurality of separate exhaust gas streams.

Although the velocities of the separate exhaust gas streams decrease with increased flow area at or near the first and second diffusion sections 40 and 42, the exhaust gas still exits the flow diffuser 20 at a substantially higher velocity than the surrounding ambient air. When the exhaust gas streams exit the flow diffuser 20, the shearing forces between the exhaust gas streams and the surrounding ambient air create a frictional drag at their barriers. This frictional drag creates a series of small vortices along the barriers of the exhaust gas streams, and the circulation of the vortices promotes mixing between the exiting streams and the surrounding ambient air to aid in the diffusion of the exhaust gas. Such mixing aids in significantly decreasing the temperature of the hot exhaust gas and the penetration distance of hot exhaust gas streams discharging from the flow diffuser 20.

The more barriers and vortices that are created and the more ambient air present at the barriers for mixing, the greater the heat diffusion of the exhaust gas. Therefore, the combination flow diversion and flow dividing, as well as the introduction of ambient air promotes increased mixing of the exhaust gas with ambient air after exiting the flow diffuser 20. In addition, if the vehicle V to which the flow diffuser 20 is attached is moving, the fluid mixing may be even more enhanced by the introduction of convective mixing principles, described above.

Now referring to FIG. 5, a flow diffuser formed in accordance with another embodiment of the present disclosure will be described in greater detail. The flow diffuser is substantially identical in materials and operation as the previously described embodiment, except for differences regarding the number and design of the diversion wings, which will be described in greater detail below. For clarity in the ensuing descriptions, numeral references of like elements of the flow diffuser 20 are similar, but are in the 100 series for the illustrated embodiment of FIG. 5.

Figure 5:
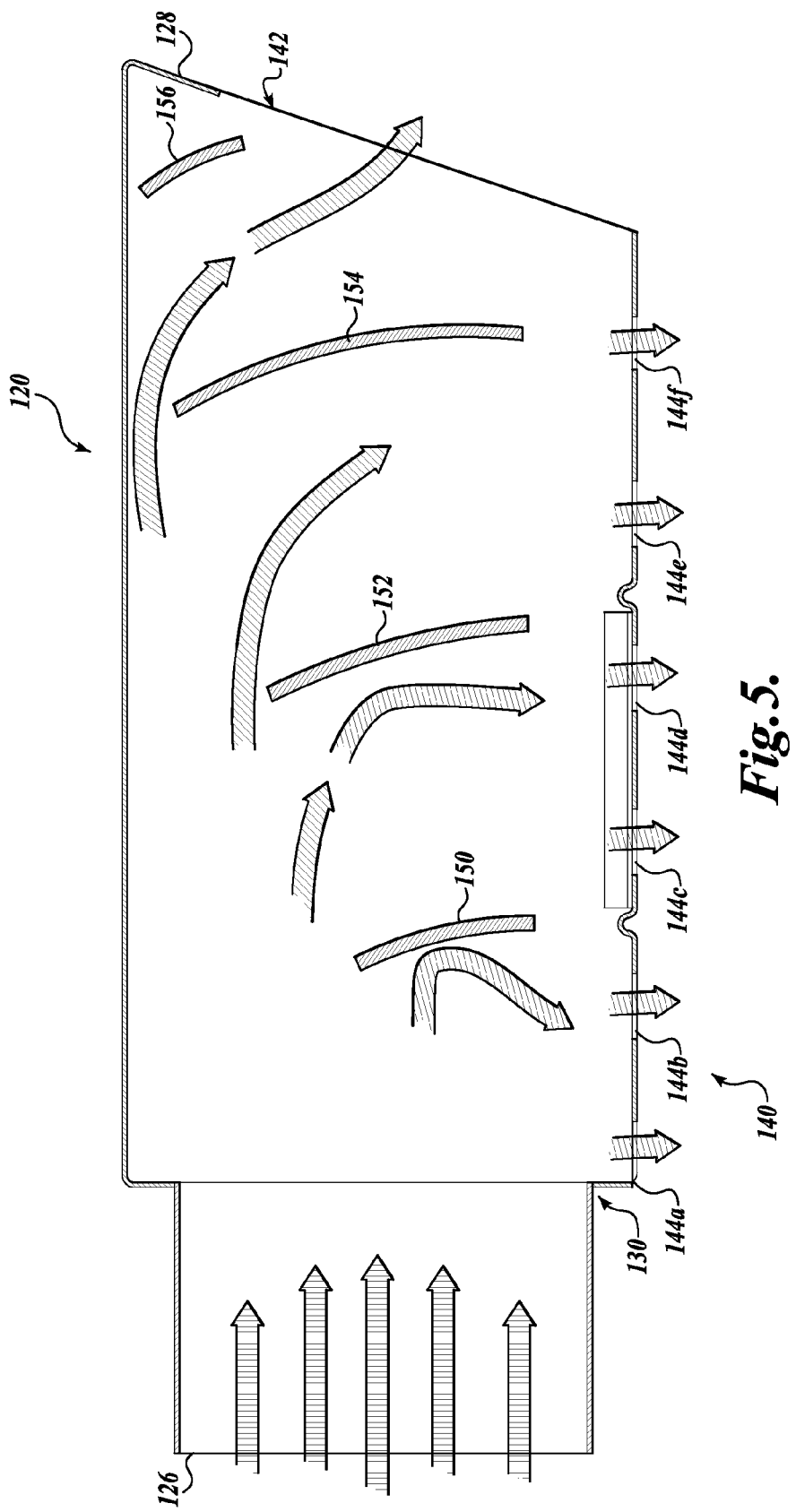
FIG. 5 is a perspective view of the flow diffuser for an exhaust pipe formed in accordance with other embodiments of the present disclosure.

In the illustrated embodiment of FIG. 5, the flow diffuser 120 includes four diversion wings 150, 152, 154, and 156. The first, second, and third diversion wings 150, 152, and 154 are substantially arcuate in design and increase in length along the travel path of the exhaust gas from the first end 126 to the second end 128 of the flow diffuser 120. The forth diversion wing 156 is smaller than the third diversion wing 154, similar to the size of the first diversion wing 150. Due to the arcuate shape of the third diversion wing 154, the third and fourth diversion wings 154 and 156 may create a Coandă Effect in the space between the diversion wings 154 and 156 to encourage additional mixing.

As a result of the diversion wings 150, 152, 154, and 156, the exhaust gas will exit the diffuser in a highly turbulent state, resulting in reduced discharge temperatures and plume size. Moreover, the diversion wings 150, 152, 154, and 156 are configured such that exhaust gas will exit each of the ports 144 of the first diffusion section 140 in a substantially equal amounts.

EXAMPLE

Comparative Exhaust Temperature Section Plots

Figure 6:
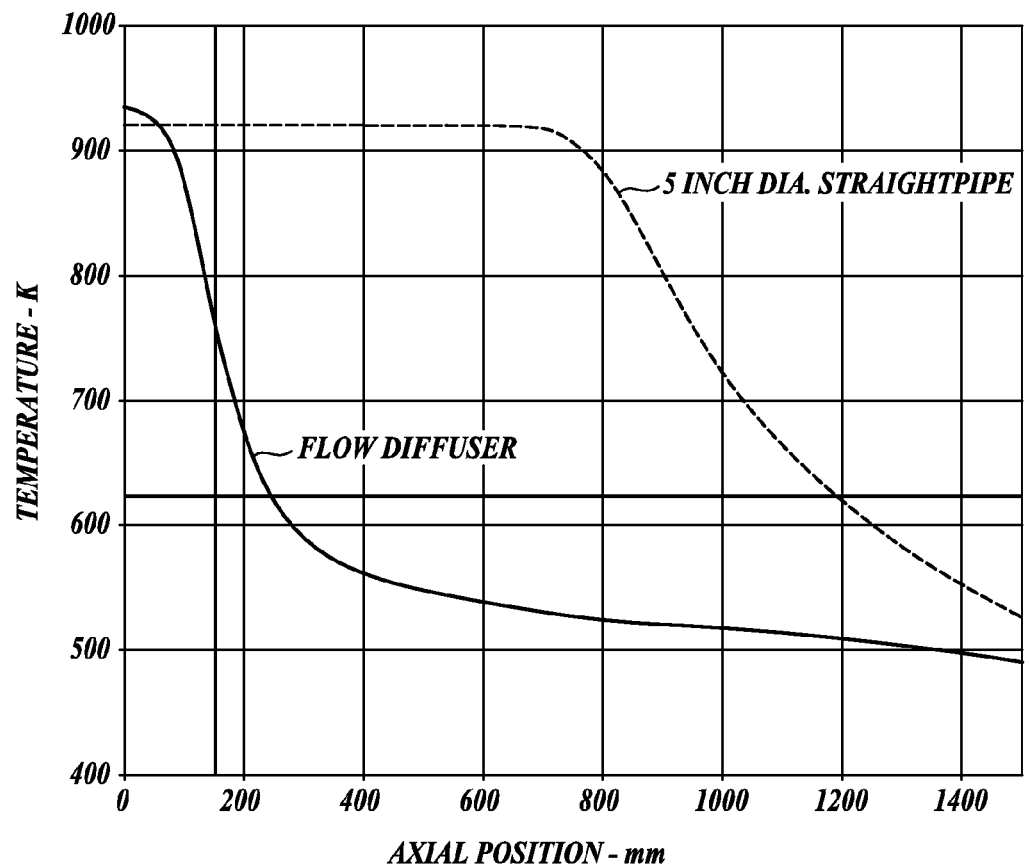
FIG. 6 is a comparison graph plotting exhaust gas exit temperature versus the distance the exhaust gas has traveled from the exit plane for the flow diffuser of FIG. 1 and a standard straight diameter exhaust pipe not having a flow diffuser.

The heat transfer and fluid mixing promoted by the flow diffuser embodiments described herein may be further understood by referring to the comparison graph shown in FIG. 6, which plots exhaust gas exit temperature versus the distance the exhaust gas has traveled from the exit plane for the flow diffuser of FIG. 1 and a standard straight diameter exhaust pipe not having a flow diffuser.

Referring to FIG. 6, the hot core of the exhaust gas streams exiting the flow diffuser 20 has immediate heat dissipation from over 900 degrees Kelvin to less than about 600 degrees Kelvin within a distance of less than about 300 mm from the rear exit plane of the diffuser 20. The hot core of the exhaust gas stream exiting the standard exhaust pipe, on the other hand, has little to no heat dissipation from over 900 degrees Kelvin to less than 600 degrees Kelvin until the exhaust gas reaches an axial distance of over 1200 mm from the exit plane of the exhaust pipe.

The comparative graph indicates that there is significantly less mixing between the exhaust gas and the surrounding ambient air at the barrier of the hot core of the exhaust gas stream from a standard straight diameter exhaust pipe, as compared to the mixing achieved with the flow diffuser 20 of FIG. 1, described above. Less mixing at the standard exhaust pipe outlet is a result of the substantially constant velocity of the exhaust gas at the exhaust pipe inlet and outlet for a standard exhaust pipe having a circular cross section. Therefore, the hot spot remains a penetrating jet of hot exhaust gas, even after traveling a vertical distance of over 700 mm from the exit plane.

Accordingly, it can be seen that the mixing and heat dissipation effects of the flow diffusers formed in accordance with embodiments of the present disclosure are significantly improved over the mixing and heat dissipation effects of a standard exhaust pipe as a result of the following: the combination of decreased exhaust stream velocity, resulting in improved mixing at the barrier; increased cross-sectional area at the exit ports of the flow diffuser, resulting in a reduced core in the exhaust gas streams and an increased barrier for the flow area for enhanced mixing; and the introduction of ambient air at the exit ports, resulting in a greater amount of ambient air at the barrier of the exhaust gas streams for enhanced mixing with ambient air.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A flow diffuser for vehicles of the type having an engine and an exhaust pipe, the flow diffuser comprising:
   (a) a body having a first end configured for attachment to an exhaust pipe, the body further comprising a second end, a length extending between the first end and the second end, and a diffusion portion including first and second diffusion sections, wherein the first diffusion section includes a plurality of ports located along the length of the body and wherein the second diffusion section includes at least one diffusion port located at the second end of the body; and
   (b) a plurality of diversion wings disposed within the body, wherein the plurality of diversion wings are configured to direct exhaust downwardly through the first diffusion section to surrounding ambient air and outwardly through the second diffusion section to surrounding ambient air; wherein at least one of the plurality of diversion wings has a design selected from the group consisting of arcuate and V-, L-, and U-shaped for redirecting flow from the first end of the body, and wherein the at least one of the plurality of diversion wings directs at least a portion at exhaust flow to at least one port in the first diffusion section, the at least one port being positioned along the length of the body closer to the first end of the body than the positioning of the at least one of the plurality of diversion wings.

2. The flow diffuser of claim 1, wherein at least one of the plurality of diversion wings is configured in a planar design.

3. The flow diffuser of claim 1, wherein at least one of the plurality of diversion wings is configured in a V-, L-, or U-shaped design.

4. The flow diffuser of claim 1, wherein the diversion wings are configured to encourage mixing of exhaust gases by the Coandă Effect.

5. The flow diffuser of claim 1, wherein the first diffusion section includes a plurality of diffusion ports.

6. The flow diffuser of claim 5, wherein the plurality of diffusion ports are a plurality of slots having a shape factor selected from the group consisting of less than about 0.7, less than about 0.5, less than about 0.3, in the range of about 0.1 to about 0.7, in the range of about 0.1 to about 0.5, and in the range of about 0.1 to about 0.3.

7. The flow diffuser of claim 5, wherein the spacing between the plurality of diffusion ports is at least as great as the average width of adjacent outlets.

8. In a land vehicle of the type having an engine and an exhaust system including an exhaust pipe, a flow diffuser for the exhaust pipe, the flow diffuser comprising:
  (a) a body having a first end configured for attachment to an exhaust pipe, the body further comprising a second end, a length extending between the first end and the second end, and a diffusion portion including first and second diffusion sections, wherein the first diffusion section includes a plurality of ports located along the length of the body and wherein the second diffusion section includes at least one diffusion port located at the second end of the body; and
  (b) a plurality of diversion wings disposed within the body, the diversion wings configured to increase exhaust gas turbulence and to direct exhaust downwardly through the first diffusion section to surrounding ambient air and outwardly through the second diffusion section to surrounding ambient air, wherein the first diffusion section includes a plurality of diffusion ports; and wherein the at least one of the plurality of diversion wings directs at least a portion of exhaust flow to at least one port in the first diffusion section, the at least one port being positioned along the length of the body closer to the first end of the body than the at least one of the plurality of diversion wings.

9. A flow diffuser for vehicles of the type having an engine and an exhaust pipe, the flow diffuser comprising:
  (a) a body having a first end configured for attachment to an exhaust pipe, the body further comprising a second end, a length extending between the first end and the second end, and a diffusion portion including first and second diffusion sections, wherein the first diffusion section includes a plurality of ports located on the underside of the body and wherein the second diffusion section includes at least one diffusion port located at the second end of the body; and
  (b) a plurality of diversion wings disposed within the body, wherein the plurality of diversion wings are configured to direct exhaust through the first diffusion section to surrounding ambient air and through the second diffusion section to surrounding ambient air, wherein at least some of the plurality of diversion wings have a design selected from the group consisting of arcuate, V-, L-, and U-shaped for redirecting flow from the first end of the body, and wherein each of the at least some of the plurality of diversion wings directs at least a portion of exhaust flow to at least one port in the first diffusion section, the at least one port being positioned along the length of the body nearer to the first end of the body than each of the at least some of the plurality of diversion wings.

10. A flow diffuser for vehicles of the type having an engine and an exhaust pipe, the flow diffuser comprising:
  (a) a body having a first end configured for attachment to an exhaust pipe, the body further comprising a second end, a length extending between the first end and the second end, and a diffusion portion including first and second diffusion sections, wherein the first diffusion section includes a plurality of ports located along the length of the body and wherein the second diffusion section includes at least one diffusion port located at the second end of the body; and
  (b) a plurality of diversion wings disposed within the body, wherein the plurality of diversion wings are configured to direct exhaust through the first diffusion section to surrounding ambient air and through the second diffusion section to surrounding ambient air, wherein the at least one of the plurality of diversion wings directs at least a portion of exhaust flow to at least one port in the first diffusion section, the at least one port being positioned along the length of the body closer to the first end of the body than the at least one of the plurality of diversion wings.

* * * * *